Patented May 7, 1940

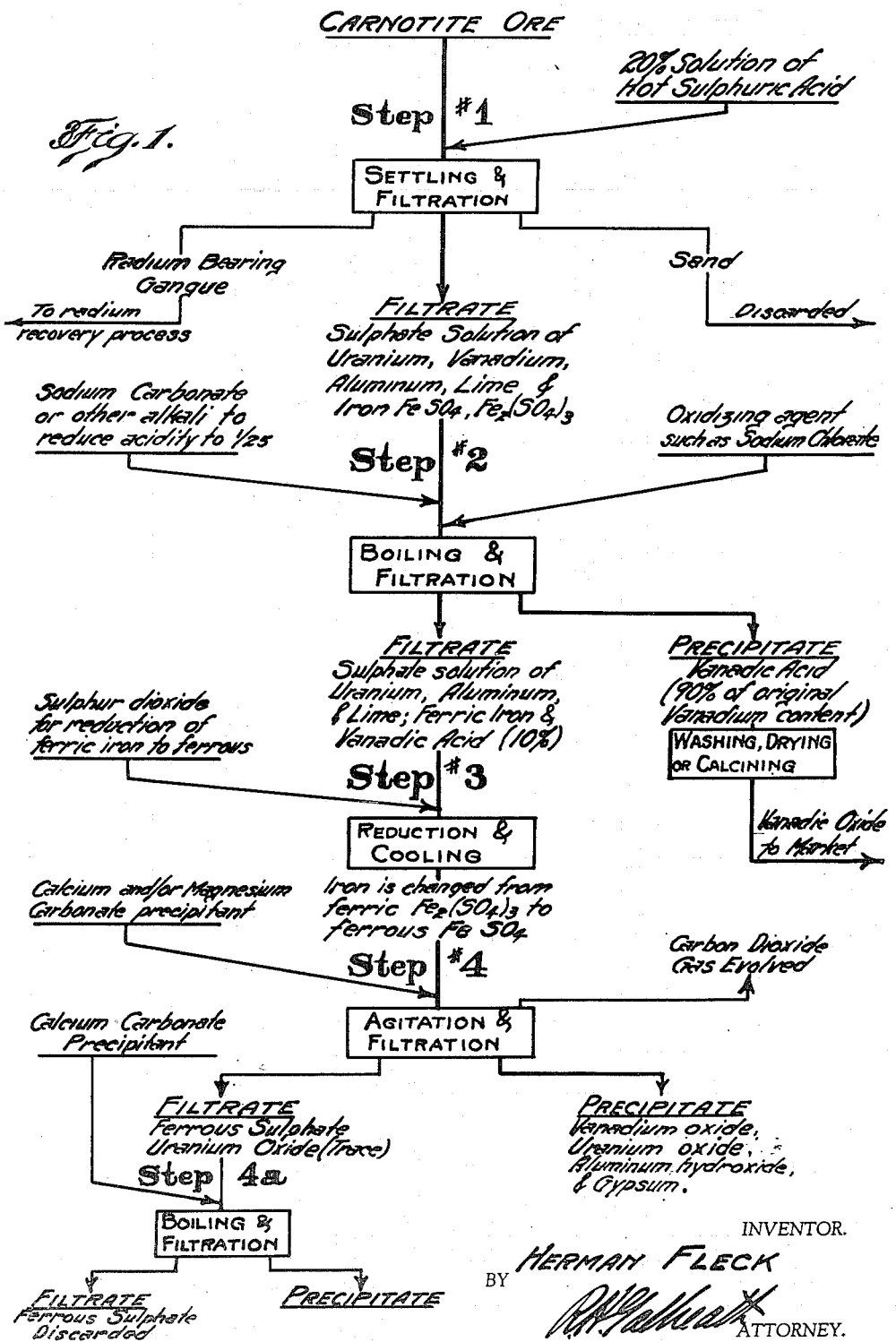

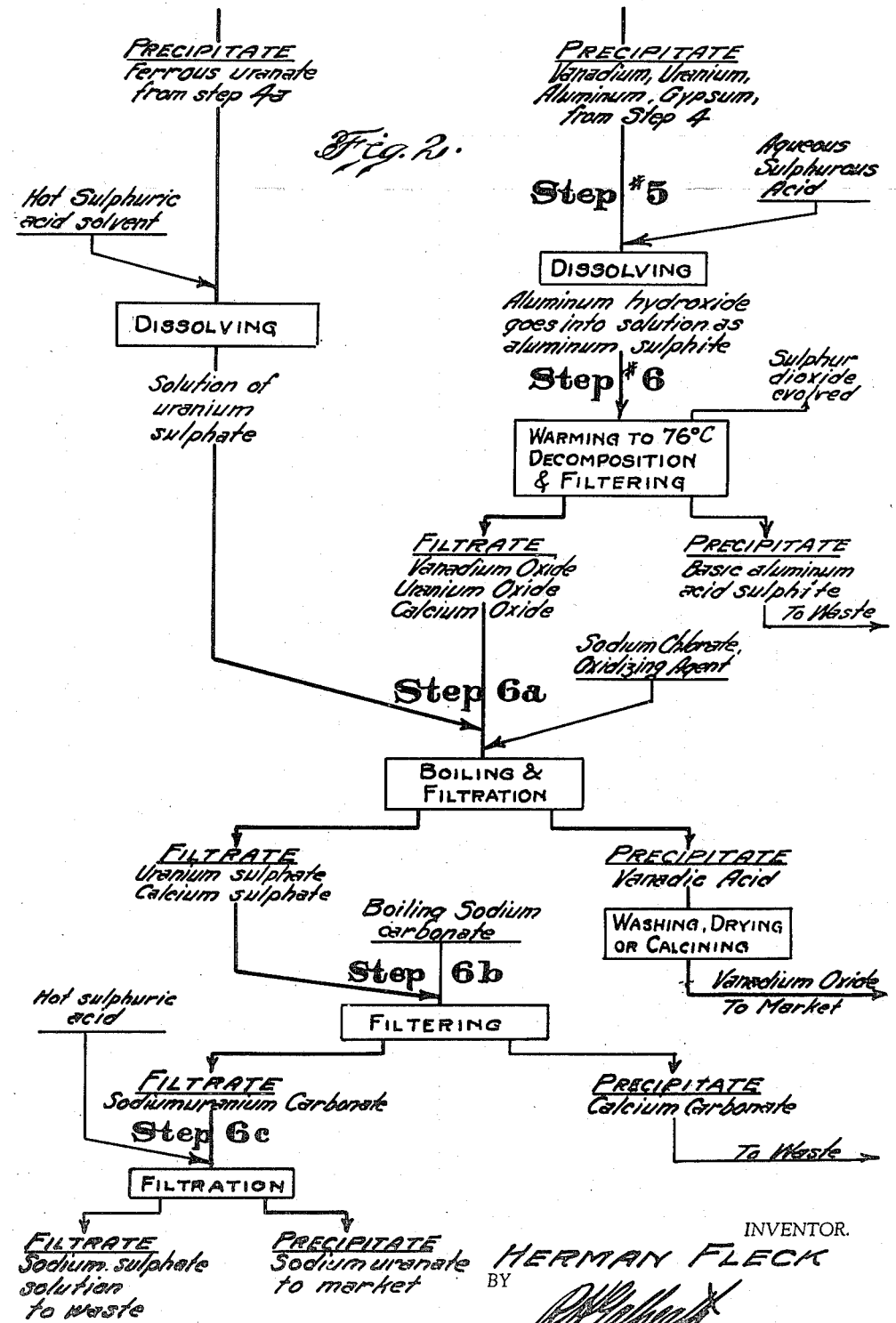

2,199,696

UNITED STATES PATENT OFFICE 2,199,696

PROCESS FOR THE RECOVERY OF URANIUM AND VANADIUM FROM CARNOTITE ORES

Herman Fleck, Santa Monica, Calif.; Herman S. Fleck administrator of said Herman Fleck, deceased Application December 17, 1937, Serial No. 180,403

6 Claims. (Cl. 23—19)

This invention relates to a process for the treatment of uranium bearing ores. The process is more particularly directed to the treatment of carnotite for the recovery of both the uranium and vanadium.

While particularly valuable in the treatment of carnotite the process is not limited to this particular ore since it is adaptable for use in the recovery of uranium from pitchblende or the many other uranium containing ores.

The principal object of the present invention is to provide a process or method which will result in a more complete recovery of the valuable constituents than heretofore possible at less cost than present processes.

Processes for the treatment of carnotite, pitchblende, etc. have made but little progress in the reduction of costs of recovery. Vanadium recovery processes have been given attention during recent years, but in substantially all of these methods the valuable uranium and radium content has been ignored and wasted.

Other processes have concentrated on the recovery of the radium and due to the high treatment cost, required the ores to be carefully selected for their freedom from the sulphate radical. The vanadium and uranium content of the rejected ore was ignored and these elements were rejected in the processes of recovery of the radium. The mining and selecting of the ore to suit the process and the rejection of ore containing uranium and vanadium values resulted in excessive radium recovery costs which could not be offset by the value of the lost uranium and vanadium. Other factors have also entered to increase treatment costs such as the high cost of the chemicals used and the presence of relatively large amounts of iron and alumina which occluded uranium values and rendered them difficult to recover in the acid baths.

A further object of this invention is to provide a method which overcomes the above difficulties and which will not require high grade ore selection; which will use relatively small quantities of economical reagents; and in which the deleterious iron and alumina will be easily and economically removed before recovery of the uranium is attempted so that a high recovery of uranium can be economically obtained.

Other objects and advantages of the process will become apparent from the following description in which reference is had to the accompanying drawings which form a part hereof.

The drawings illustrate a typical flow chart of the process. Fig. #2 of the drawings is a continuation of the chart of Fig. #1.

The method of final recovery of the radium present in the ore is the subject of a separate application. The present specification is directed to the recovery of the vanadium and uranium therefrom.

Briefly, the process comprises (1) bringing the uranium, vanadium, iron and aluminum into solution; (2) precipitating the vanadium from the solution; (3) changing the iron to the ferrous state; (4) precipitating the aluminum and a portion of the uranium from the ferrous sulphate solution of the remainder of the uranium; (4a) precipitating the uranium from the above solution to eliminate the iron and dissolving the precipitate to form a uranium-sulphate solution; (5) dissolving the aluminum-uranium precipitate from step #4; (6) precipitating the aluminum from the latter solution to leave the uranium in solution; (6a) combining the latter solution with the uranium sulphate solution of step #4a to bring all the uranium together with the iron and aluminum eliminated; (6b) precipitating out the lime from the combined solutions; (6c) thence precipitating out the uranium. Thus, what has heretofore been an expensive, wasteful proceeding has been reduced to a series of simple economical steps.

The details of the process can best be understood by following through a typical charge of ore. In the following detailed description of the process reference is made to the flow chart of the accompanying drawings by suitable reference letters and numerals.

The ore is preferably crushed, screened and classified according to the usual ore dressing methods to a mash sufficient to expose the mineral values. Concentration of low grade ores would of course be desirable.

Step #1

The first step is to reduce the entire charge to an acid solution. This may be accomplished by various acids and in various ways. Preferably, but not necessarily, hot, dilute sulphuric acid (20% concentration) is employed, the amount depending upon the particular ore being treated. Sufficient acid must be used to provide a slight excess. Four hundred pounds of 96% $H_2SO_4$, diluted to 20%, to the ton of ore or concentrate has been found effective on the usual ore.

The ore is placed in the acid bath and is preferably agitated to facilitate the action. Less than an hour will usually complete the solution.

The cloudy liquor is then drawn off from the first settling sands with the radium slimes in suspension. The latter solution is then allowed to settle for a period of days after which the clear solution is elutriated from the settled slimes, or slimes may be separated from the liquid by mechanical means. The latter slimes are treated for the recovery of their radium content by a separate process forming the subject matter of copending application Serial No. 183,115.

The resulting solution is usually clear blue in color and contains the uranium, vanadium, lime, aluminum, and iron salts in an excess of acid.

Step #2

Sufficient sodium carbonate, $NaCO_3$, or other suitable available alkali is added to the solution to reduce the acidity to approximately $1/25$ normal. The amount of alkali should be just short of that which would form a precipitate of the uranium or vanadium.

Any insoluble products formed by the neutralizing agent, such as burned lime or lime stone, are removed by an intermediate filtration at this point.

An oxidizing agent such as sodium chlorate, $NaClO_3$, is now added in calculated amount to fully oxidize the vanadium content and the solution is heated to boiling. This causes the major portion (90%+) of the vanadium to be precipitated as crystalline vanadic acid ($HVO_3$). The latter is filtered off, washed, dried and calcined or sintered to produce vanadic oxide ($V_2O_5$) ready for market.

Step #3

The filtrate from step #2, a clear yellow solution containing the uranium, together with the ferric iron, aluminum, and lime in solution, and a small percentage of the vanadium unrecovered in the above precipitation (approximately 10% of the original vanadium content of the ore) is now brought to a fully reduced state of oxidation by means of any suitable reducing agent, preferably sulphur dioxide, and when fully reduced is cooled.

It is desired to call attention to the fact that the iron was oxidized to the ferric state by the sodium chlorate oxidizing agent in step #2. The reduction by $SO_2$ above now changes the state of oxidation of the iron from the ferric, $$Fe_2(SO_4)_3$$

to the ferrous, $FeSO_4$, state. This is important, for in the following step it is necessary that the iron remain in the filtrate. Ferric iron would go down with the uranium in the precipitate, while the ferrous iron remains in the solution.

Step 4

The cooled reduced solution from step #3, above, a greenish blue solution carrying the uranium, vanadium, aluminum and calcium as sulphates and the iron as ferrous sulphate, is now treated with calcium or magnesium carbonate or with dolomite (both calcium and magnesium carbonates). The batch is thoroughly agitated until the evolution of carbon dioxide ceases. A heavy flocculent precipitate is formed consisting principally of aluminum hydroxide $Al_2(OH)_6$, and calcium sulphate $CaSO_4$ with any remaining vanadium as vanadyl oxide, $V_2O_4$, and a small but recoverable amount of uranium as uranium oxide, $VO_3$. The $CaSO_4$ forms with the water, $CaSO_4.2H_2O$, or gypsum, a feathery needle-like precipitate mass which makes the quantitatively small amounts of difficult, jelly-like U and V precipitates easily filterable. The iron remains in the filtrate as ferrous sulphate, together with the uranium oxide $U_3O_8$.

Step 4a

The uranium in the solution may now be easily recovered by boiling the ferrous sulphate filtrate with additional calcium or magnesium carbonate which throws down a heavy greenish precipitate of ferrous uranate which is dissolved in hot sulphuric acid to form a uranium sulphate $UO_2SO_4$ solution which is returned to the uranium liquor in step 6a. The ferrous sulphate solution containing the detrimental iron is discharged to waste.

Step 5

Returning now to the precipitate from step #4 consisting principally of gypsum $CaSO_4.H_2O$, hydrated vanadium oxide $V_2O_4$, uranium oxide $U_3O_8$, and aluminum hydroxide $Al_2(OH)_6$. This precipitate is mixed into a thin pulp with water and sulphur dioxide gas is passed through the pulp. The pulp could of course be passed through the gas if preferred. In either case the result is the dissolution of the precipitate in aqueous sulphurous acid. This causes the aluminum present as $Al_2(OH)_6$ to go into solution as the sulphite, $Al_2(SO_3)_3$.

Step 6

The alumina is now removed from the above solution by simply warming the above solution to temperature of approx. 74°–76° C. in a closed vessel under heat control. This temperature is not sufficient to completely decompose the sulphurous acid but it does, in the presence of the sulphurous acid, cause spontaneous decomposition of the aluminum sulphite, $Al_2(SO_3)_3$, that is, some of the sulphur dioxide bound to the alumina in the compound is disassociated from its molecule $Al_2(SO_3)_3$ and the latter takes on an hydroxyl group to form insoluble basic aluminum sulphite crystals ($Al_2O_3.SO_2.4H_2O$). The released sulphur dioxide is evolved from the solution and the new compound of insoluble basic aluminum sulphite crystals is precipitated, filtered off and discarded to waste. In this way 90% or more of the alumina is eliminated in a form entirely different from its form in the original ore thereby leaving the field simplified for the recovery of the uranium and the remaining vanadium.

We have now eliminated both the iron and the alumina which in prior processes have exerted an enveloping effect on the uranium in the acid treatment making high percentage of recovery expensive and difficult even with high grade ores (2%+uranium) and utterly impossible with low grade ores.

This successful elimination of both the iron and alumina before the final precipitation of the uranium as sodium uranate is one of the principal objects and advantages of the present process.

Step 6a

The dissolved precipitate from step 4a is combined with the filtrate from step 6, above and the combined solution is treated for the recovery of any vanadium which may have escaped the vanadium precipitation of step #2, above. A calculated amount of sodium chlorate $NaClO_3$ or other suitable oxidizing agent is added and the solution is boiled to precipitate vanadic acid as in step #2 above. This is filtered off and added to the formerly recovered vanadic acid for treatment for market.

Step 6b

The remaining filtrate from step 6a, is a clear yellow solution which comprises, in the main, uranium sulphate $UO_2SO_4$ and calcium sulphate $CaSO_4$.

This solution is run into an excess of boiling sodium carbonate which forms a temporary precipitate with the uranium and precipitates the lime as calcium carbonate $(CaCO_3)$. The uranium precipitate, however, is immediately redissolved in the excess of sodium carbonate to form a solution of soluble sodiumuranium carbonate, $Na_2UO_2(CO_3)_2$. The solution is now filtered and the insoluble calcium carbonate together with a small amount of iron arising from the ferrous uranate precipitate is discarded to waste.

Step 6c

The filtrate from the above carrying the double carbonate of sodium and uranium, $Na_2UO_2(CO_3)_2$, is now treated with sulphuric acid, preferably hot, to decompose the double carbonate into insoluble, yellow, sodium uranate, $NaUO_4$, and a valueless solution of sodium sulphate, $Na_2SO_4.10H_2O$ (Glauber's salt) and sodium carbonate, $NaCO_3$. The solution is filter pressed, the filtrate is discarded to waste, and the valuable sodium uranate precipitate is dried and prepared for market.

*Alternative step 6c.*—The filtrate from step 6b, $(Na_2UO_2(CO_3)_2$, may be heated with a slight excess of sulphuric acid. The carbonic acid is then boiled off and sufficient caustic soda added to precipitate the uranium as sodium uranate.

While the improved process has been described in some detail in order that those skilled in the art will be enabled to place it in practice after the expiration of any patent or patents which may be issued thereon, it is desired to be understood that the invention is not limited to the precise procedure described nor is it dependent upon the accuracy of any theories which may have been advanced herein. On the contrary, the invention is not to be regarded as limited in any way except in so far as such limitations are contained within the scope of the accompanying claims in which it is intended to claim the invention as broadly as possible in view of the prior art.

Having thus described the invention, what is claimed and desired secured by Letters Patent is:

1. A process for the recovery of uranium from a sulphate solution thereof containing ferrous iron, vanadium, aluminum and lime compounds including: cooling the solution; neutralizing the solution to precipitate the aluminum and lime and a portion of the uranium; dissolving the precipitate with aqueous sulphurous acid; warming the solution to from 74° C. to 76° C. to convert the aluminum sulphite to insoluble basic aluminum sulphite crystals; removing the latter by filtration; adding an oxidizing agent and boiling to precipitate any vanadium present; again filtering; thence adding hot sodium carbonate to the filtrate to precipitate the lime therefrom.

2. A process for the recovery of uranium from a mixture containing uranium, vanadium, and aluminum compounds comprising: transforming the alumina into a sulphite solution with the uranium; warming the solution to from 74° C. to 76° C. to form an insoluble basic aluminum sulphite crystalline precipitate; thence refining the filtrate for the recovery of the uranium.

3. A process for the recovery of uranium from a mixture containing lime, uranium, vanadium, and aluminum compounds comprising: transforming the alumina into a sulphite solution with the uranium; warming the solution sufficiently to liberate sulphur dioxide in the solution to change the soluble aluminum sulphite into an insoluble basic aluminum sulphite crystalline precipitate; adding an oxidizing agent and heating to precipitate a vanadium compound; filtering off the latter; thence treating the filtrate with a carbonate to precipitate calcium carbonate and form a sodium uranium carbonate solution.

4. A process for the recovery of uranium from a mixture containing lime, uranium, and aluminum comprising: transforming the alumina into a sulphite solution with the uranium; warming the solution to a temperature below 76° C. to convert the aluminum sulphite into an insoluble aluminum sulphite crystalline precipitate; adding an oxidizing agent and heating to precipitate a vanadium compound; filtering off the latter; thence treating the filtrate with a carbonate to precipitate calcium carbonate and form a sodium uranium carbonate solution; thence treating the sodium uranium carbonate solution with sulphuric acid to form a sodium uranate precipitate.

5. A process for the recovery of uranium from a sulphate solution thereof containing ferrous iron, vanadium, aluminum and lime compounds including: adding an alkaline earth metal carbonate to the cold solution to precipitate the aluminum and a portion of the uranium from the ferrous solution of the remainder of the uranium; heating the latter solution and adding additional carbonate to precipitate the uranium from the latter solution to eliminate the iron; dissolving the latter precipitate with sulphuric acid to form a uranium sulphate solution; dissolving the aluminum uranium precipitate thrown down from the cold ferrous solution in aqueous sulphurous acid; warming the latter solution to 74° C. to 76° C. to precipitate and eliminate the aluminum as insoluble basic aluminum sulphite crystals; combining the latter remaining solution with the above formed uranium sulphate solution to bring all the uranium together with the iron and aluminum eliminated therefrom.

6. A process for the removal of aluminum and lime from a combined precipitate of lime, aluminum, vanadium and uranium comprising: dissolving the precipitate in aqueous sulphurous acid as soluble sulphites; thence warming the solution sufficiently to convert the soluble aluminum sulphite ($Al_2(SO_3)_3$) into insoluble crystalline basic aluminum sulphite, but not sufficiently to completely decompose the sulphurous acid; removing the basic aluminum sulphite crystals by filtration; adding an oxidizing agent and heating to precipitate a vanadium compound; filtering off the latter; thence adding a carbonate to the filtrate at boiling temperature to precipitate the lime from the uranium bearing filtrate.

HERMAN FLECK.